(12) United States Patent
Kim (10) Patent No.: US 10,661,786 B2
(45) Date of Patent: May 26, 2020

(54) AUTONOMOUS PARKING ASSIST APPARATUS AND METHOD FOR ASSISTING PARKING USING THE SAME

(71) Applicant: Hyundai Motor Company, Seoul (KR)

(72) Inventor: Jun Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 215 days.

(21) Appl. No.: 15/434,759

(22) Filed: Feb. 16, 2017

(65) Prior Publication Data

US 2018/0162384 A1 Jun. 14, 2018

(30) Foreign Application Priority Data

Dec. 9, 2016 (KR) .................. 10-2016-0167637

(51) Int. Cl.
 *B60W 30/06* (2006.01)
 *B62D 15/02* (2006.01)

(52) U.S. Cl.
 CPC .......... *B60W 30/06* (2013.01); *B62D 15/0285* (2013.01); *B60W 2420/42* (2013.01); *B60W 2420/52* (2013.01); *B60W 2420/54* (2013.01); *B60W 2750/308* (2013.01)

(58) Field of Classification Search
 CPC ............. B60W 30/06; B60W 2420/52; B60W 2420/42; B60W 2420/54; B60W 2750/308; B62D 15/0285
 USPC .......................................................... 701/41
 See application file for complete search history.

(56) References Cited

U.S. PATENT DOCUMENTS

| 8,948,990 | B2* | 2/2015 | Kobayashi | B62D 15/0285 |
| | | | | 340/932.2 |
| 2015/0039213 | A1* | 2/2015 | Stefan | G08G 1/00 |
| | | | | 701/117 |
| 2017/0267288 | A1* | 9/2017 | Maguire | B62D 15/0285 |
| 2017/0305466 | A1* | 10/2017 | Nordbruch | B62D 15/0285 |
| 2018/0009477 | A1* | 1/2018 | Pla Rubio | B62D 15/0285 |
| 2018/0194343 | A1* | 7/2018 | Lorenz | G05D 1/0282 |

FOREIGN PATENT DOCUMENTS

| JP | 2011-230549 | 11/2011 |
| JP | 2013-126868 | 6/2013 |
| KR | 10-2011-0132028 | 12/2011 |
| KR | 10-2013-0017564 | 2/2013 |

* cited by examiner

*Primary Examiner* — Peter D Nolan
*Assistant Examiner* — Luat T Huynh
(74) *Attorney, Agent, or Firm* — Mintz Levin Cohn Ferris Glovsky and Popeo, P.C.; Peter F. Corless (57) ABSTRACT

An autonomous parking assist apparatus and a method for assisting parking using the apparatus are provided. The autonomous parking assist apparatus includes an environment information detector that detects surrounding environment information of a vehicle and a processor that senses a change in a parking environment using the environment information detector after the vehicle is parked. Additionally, the processor determines whether a realignment of the vehicle is required and performs the realignment of the vehicle based on the determined result.

20 Claims, 11 Drawing Sheets

AUTONOMOUS PARKING ASSIST APPARATUS AND METHOD FOR ASSISTING PARKING USING THE SAME

CROSS-REFERENCE TO RELATED APPLICATION

This application is based on and claims the benefit of priority to Korean Patent Application No. 10-2016-0167637, filed on Dec. 9, 2016, in the Korean Intellectual Property Office, the disclosure of which is incorporated herein in its entirety by reference.

TECHNICAL FIELD

The present disclosure relates to an autonomous parking assist apparatus for improving an alignment of a vehicle by re-parking the vehicle, when necessary, after monitoring changes in the surrounding environment of the parked vehicle, and a method for assisting the autonomous parking using the same.

BACKGROUND

An autonomous parking assist system is a system that recognizes a parking space based on distance information between a vehicle and surrounding obstacles, which are sensed by various sensors, and automatically adjusts steering angle, vehicle speed, and gear-shifting without a driver's steering wheel operation to park the vehicle. The autonomous parking assist system allows the vehicle to be parked in a target parking space based on position and size information of the target parking space, which are sensed by the sensors installed therein.

The operation of the autonomous parking assist system is deactivated after the vehicle is parked in the parking space identified by an ultrasonic sensor or an around view monitor (AVM). However, when nearby vehicles are parked incorrectly or an alignment of the nearby vehicles parked next to the vehicle is changed, a space between the vehicle and the nearby vehicles is insufficient for the driver to enter the vehicle.

SUMMARY

The present disclosure provides an autonomous parking assist apparatus for improving an alignment of a vehicle by re-parking the vehicle, when necessary, after monitoring changes in the surrounding environment of the parked vehicle, and a method for assisting the autonomous parking using the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an autonomous parking assist apparatus may include an environment information detector configured to detect surrounding environment information of a vehicle and a processor configured to sense a change in a parking environment using the environment information detector after the vehicle is parked, determine whether a realignment of the vehicle is required, and execute the realignment of the vehicle based on the determined result.

The environment information detector may include at least one of an imaging device, an RADAR, an LiDAR, and an ultrasonic sensor. The processor may be configured to sense whether another vehicle parked proximate to the vehicle exits the parking space based on the surrounding environment information. The processor may further be configured to sense or determine whether another vehicle is parked in an empty parking space around the vehicle based on the surrounding environment information. The processor may further be configured to periodically sense whether the change in the parking environment occurs using the environment information detector. The processor may be configured to determine whether the realignment of the vehicle is required based on whether a space is available between the vehicle and another vehicle parked next to the vehicle.

The space may be a space that is sufficiently large to allow a driver to open a door of the vehicle and enter the vehicle without being blocked by the other vehicle. The processor may be configured to determine whether the realignment of the vehicle is required based on whether the vehicle is parked at a center of a space defined by a parking lot line. When the vehicle is parked in a parking space in which a parking lot line does not exist, the processor may be configured to determine whether the realignment of the vehicle is required based on whether an alignment degree of the vehicle is in agreement with alignment degrees of other vehicles parked next to the vehicle.

According to another aspect of the present disclosure, a method for assisting a parking of a vehicle using an autonomous parking assist apparatus may include sensing a change in a parking environment of the vehicle after the vehicle is parked, determining whether a realignment of the vehicle is required when the change is sensed in the parking environment, and performing the realignment of the vehicle when the realignment of the vehicle is required.

The sensing of the change in the parking environment may include entering a standby mode after the vehicle is parked, detecting whether an exit of the vehicle is requested after waiting for a predetermined time period in the standby mode, and sensing whether the change in the parking environment occurs when the exit of the vehicle is not requested. Additionally, the sensing of the change in the parking environment may include sensing whether another vehicle parked next to the vehicle exits the parking space. The sensing of the change in the parking environment may include sensing whether another vehicle is parked in an empty parking space around the vehicle.

The determination of whether the realignment of the vehicle is required may be performed based on whether a space is available between the vehicle and another vehicle parked next to the vehicle. The determination of whether the realignment of the vehicle is required may be performed based on whether the vehicle is parked at a center of a space defined by a parking lot line. When the vehicle is parked in a parking space in which a parking lot line does not exist, the determination of whether the realignment of the vehicle is required may be performed based on whether an alignment degree of the vehicle is in agreement with alignment degrees of other vehicles parked next to the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
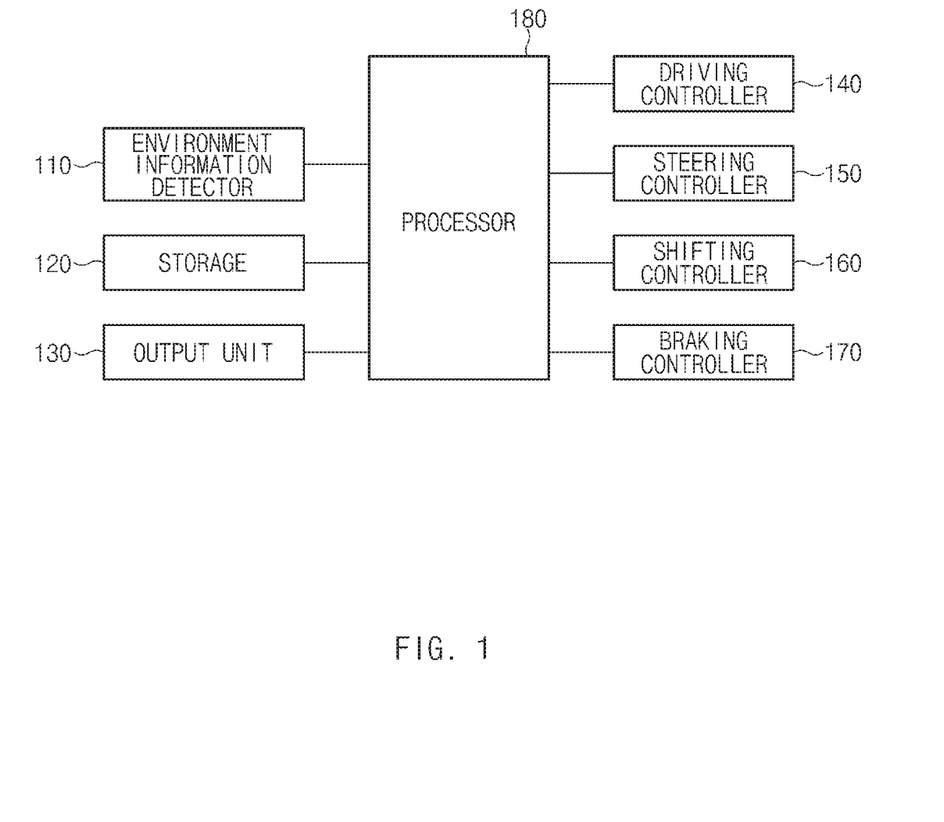
FIG. 1 is a block diagram illustrating an autonomous parking assist apparatus according to an exemplary embodiment of the present disclosure.
Figure 2:
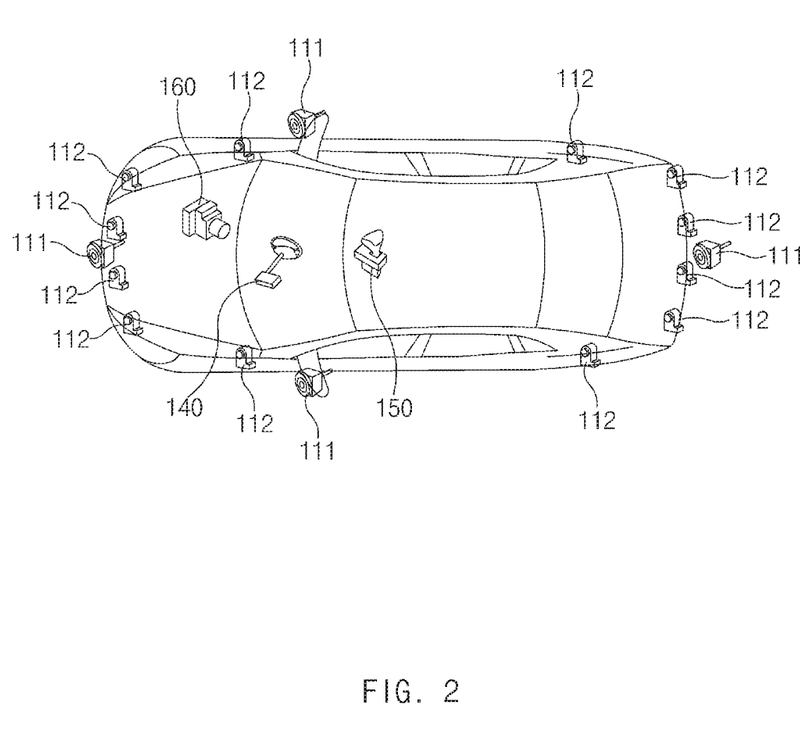
FIG. 2 is a view showing an imaging device and an ultrasonic sensor mounted on a vehicle according to exemplary embodiment of the present disclosure.

Hereinafter, exemplary embodiments of the present disclosure will be described in detail with reference to accompanying drawings. FIG. 1 is a block diagram illustrating an autonomous parking assist apparatus according to an exemplary embodiment of the present disclosure, and FIG. 2 is a view showing an imaging device and an ultrasonic sensor mounted on a vehicle according to an exemplary embodiment of the present disclosure.

Referring to FIG. 1, the autonomous parking assist apparatus may include an environment information detector 110, a storage 120, an output unit 130, a driving controller 140, a steering controller 150, a shifting controller 160, a braking controller 170, and a processor 180. In particular, the processor 180 may be configured to transmit and receive data and/or execute commands to and from the environment information detector 110, the storage 120, the output unit 130, the driving controller 140, the steering controller 150, the shifting controller 160, and the braking controller 170 via a vehicle network. The vehicle network may be implemented by a controller area network (CAN), a media oriented systems transport (MOST) network, a local interconnect network (LIN), or an X-by-Wire (Flexray). Further, the processor 180 may be part of an upper controller also having a memory and the upper controller may be configured to operate the other various components of the apparatus.

The environment information detector 110 may be configured to detect surrounding environment information of a vehicle. The environment information detector 110 may include an imaging device (e.g., a camera, video camera, or the like) 111 and an ultrasonic sensor 112. The imaging device 111 may be configured to capture/acquire image information regarding objects located in all surrounding directions of the vehicle. As shown in FIG. 2, one or more imaging devices 111 may be installed at front, rear, and/or side of the vehicle depending on their uses. For instance, the imaging device 111 may include a front-facing close-range camera and a front-facing long-range camera, installed at a front side of the vehicle, a rear-facing close-range camera and a rear-facing long-range camera, installed at a rear side of the vehicle, and an around view monitor (AVM) camera installed at the front, rear, and side of the vehicle.

The imaging device 111 may be implemented by one or more image sensors among image sensors, e.g., a charge-coupled device (CCD) image sensor, a metal-oxide-semiconductor (MOS) image sensor, a charge priming device (CPD) image sensor, a charge injection device (CID) image sensor, etc. Further, the ultrasonic sensor 112 may be configured to measure a distance between the vehicle and a near obstacle located near the vehicle (e.g., in the vicinity of the vehicle or within a predetermined distance range of the vehicle). As shown in FIG. 2, one or more ultrasonic sensors 112 may be installed at front, rear, front side, and rear side of the vehicle. The environment information detector 110 may include a radio detecting and ranging (RADAR) and a light detection and ranging (LiDAR).

Furthermore, the storage (e.g., memory) 120 may be configured to store a program for an operation of the processor 180. The storage 120 may be implemented by one or more storage media among storage media, e.g., a flash memory, a hard disk, a secure digital (SD) card, a random access memory (RAM), a read only memory (ROM), a web storage, etc. The output unit 130 may be configured to output a driver's operation guide to allow the driver to execute the guided operation and a correction information feedback while the autonomous parking assist apparatus is in operation. The output unit 130 may include a display, an audio output unit, and a haptic module to output information, such as visual information, aural information, haptic information, etc.

The display may include at least one of a liquid crystal display (LCD), a thin film transistor liquid crystal display (TFT LCD), an organic light-emitting diode (OLED), a flexible display, a three-dimensional (3D) display, a transparent display, a head-up display (HUD), a touch screen, and a cluster. Particularly, the audio output unit may be configured to output audio data stored in the storage 120. The audio output unit may include a receiver, a speaker, and/or a buzzer, or the like. The haptic module may be configured to output a signal that may be perceived by a user with a tactile sense. As an example, the haptic module may be implemented by a vibrator to adjust the intensity and pattern of vibrations.

The driving controller 140 may be an actuator configured to operate an engine of the vehicle to adjust an acceleration/deceleration of the vehicle. The driving controller 140 may be implemented by an engine management system (EMS). The driving controller 140 may further be configured to adjust a drive torque of the engine based on accelerator pedal position (e.g., an engagement amount of the pedal) information provided from an accelerator pedal position sensor. The driving controller 140 may also be configured to adjust an engine output to achieve a target drive torque requested by the processor 180 while the autonomous parking system is in operation. The steeling controller 150 may be an actuator configured to adjust a steering angle of the vehicle. The steering controller 150 may be implemented by a motor drive power steering (MDPS). The shifting controller 160 may be an actuator configured to operate a transmission of the vehicle. The shifting controller 160 may be implemented by a shift-by-wire (SBW) system.

Additionally, the braking controller 170 may be an actuator configured to adjust a longitudinal braking force of the vehicle. Accordingly, the braking controller 170 may be implemented by an electronic stability control (ESC). The braking controller 170 may be configured to adjust the braking force to achieve a target speed requested by the processor 180 while the autonomous parking system is in operation. Accordingly, the braking controller 170 may be configured to adjust the speed of the vehicle.

The processor 180 may be configured to execute a search for parking spaces using sensors, e.g., an ultrasonic sensor, a camera, a radar, a lidar, etc., when a parking switch (not shown) is turned on, and select one parking space among the searched parking spaces as a target parking space. Then, the processor 180 may be configured to generate a parking trajectory required to park the vehicle in the target parking space and operate the driving controller 140, the steering controller 150, the shifting controller 160, and the braking controller 170 based on the parking trajectory, to thus operate the vehicle to park the vehicle in the target parking space. The processor 180 may be configured to generate the parking trajectory using known parking trajectory generating techniques.

After the vehicle is parked, the processor 180 may be configured to detect whether a change (variation) occurs in a parking environment around the vehicle using the environment information detector 110. For instance, when another vehicle parked next to the vehicle exits a parking lot or another vehicle parks in an empty parking space next to the vehicle, the processor 180 may be configured to detect the leaving or parking of other vehicles using the environment information detector 110. In particular, the processor 180 may be configured to periodically sense the variation in the parking environment using the environment information detector 110.

When the parking environment is changed, that is, when the processor 180 detects a change in the environment surrounding the subject (parked) vehicle, the processor 180 may be configured to measure a distance between a driver side door of the subject or parked vehicle and a nearby vehicle using the environment information detector 110. Particularly, the processor 180 may be configured to determine whether the distance is sufficient to allow a driver to enter the vehicle based on the measured distance or whether the opening of the door would be blocked by the nearby vehicle. In other words, the processor 180 may be configured to determine whether a space allowing the driver to enter the vehicle is available or sufficient between the vehicle and the nearby vehicle and determine whether the driver is able to enter the vehicle based on the checked result. In particular, the space may be determined based on previously-registered physical information of the driver. When the driver is unable to enter the vehicle, the processor 180 may be configured to determine that the vehicle is required to be realigned. Accordingly, the processor 180 may be configured to operate the driving controller 140, the steering controller 150, the shifting controller 160, and the braking controller 170 to realign the vehicle. That is, the vehicle may be autonomously driven to realign the vehicle within the target parking space to thus provide sufficient distance to other vehicle or objects for a driver to enter and exit the vehicle when parked.

When the change of the parking environment is sensed, the processor 180 may be configured to determine whether the realignment of the vehicle is required in consideration of an alignment degree of the vehicle in a parking lot line. When the vehicle is required to be realigned, the processor 180 may be configured to operate the driving controller 140, the steering controller 150, the shifting controller 160, and the braking controller 170 to realign the vehicle within the parking lot line (e.g., within the target parking space). When the vehicle is parked in a parking space in which no parking lot line exists, the processor 180 may be configured to determine whether the vehicle is required to be realigned based on whether the space allowing the driver to enter the vehicle is sufficient between the vehicle and other vehicles parked next to the vehicle or whether the alignment degree of the vehicle is in agreement with the alignment degree of other vehicles. For example, if nearby vehicles are parked at a particular angle, the processor 180 is capable of operating the other components such that the vehicle is parked at about the same angle to thus provide sufficient space between the parked vehicles. Thus, the vehicle may be realigned to correspond to the surrounding vehicles despite no parking lines being detected.

Figure 3:
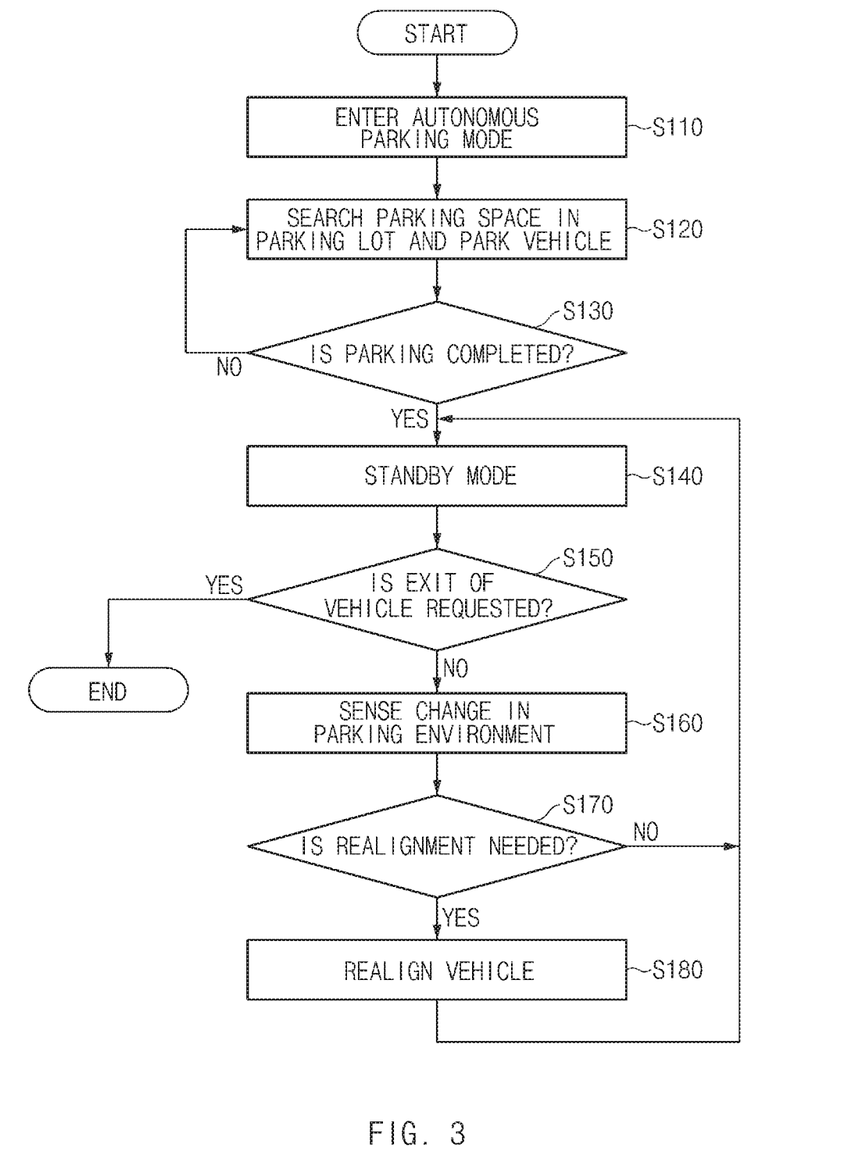
FIG. 3 is a flowchart showing a method of assisting parking using an autonomous parking assist apparatus according to exemplary embodiment of the present disclosure.

FIG. 3 is a flowchart showing a method of assisting parking using an autonomous parking assist apparatus according to an exemplary embodiment of the present disclosure. Particularly, the processor 180 may enter an autonomous parking mode when the parking switch (not shown) is operated or engaged by the driver (S110). The processor 180 may be configured to search the parking spaces in the parking lot to park the vehicle (S120). That is, the processor 180 may be configured to detect empty parking spaces in the parking lot using the environment information detector 110 and select one empty parking space among the searched empty parking spaces as a target parking space. The processor 180 may then be configured to generate the parking trajectory for the selected target parking space and adjust the steering angle, speed, and gear-shifting of the vehicle based on the generated parking trajectory to park the vehicle in the selected target parking space.

When the parking of the vehicle is completed (S130), the processor 180 may enter a standby mode (S140). In other words, the processor 180 may remain in a standby mode or wait for a predetermined period of time (e.g., about 30 minutes) after the parking of the vehicle is completed. The processor 180 may then be configured to detect whether the exit of the vehicle (e.g., an exit from the parking space) is requested after waiting for the predetermined period of time (S150). For instance, when the driver instructs (e.g., provides a signal) the vehicle to exit the parking space using a mobile terminal or a fob key, the processor 180 may be configured to detect the request based on the exit instruction for the vehicle received via a wireless communication module (not shown).

When the exit instruction for the vehicle is not receive, the processor 180 may be configured to detect whether there is a change in the parking environment surrounding the vehicle using the environment information detector 110 (S160). For instance, the processor 180 may be configured to detect the change in the parking environment around the vehicle when the processor 180 does not receive the exit instruction for the vehicle via the wireless communication module. In other words, the processor 180 periodically detects changes in the parking environment around the vehicle when a request for leaving the parking space is not received.

When the change of the parking environment is detected, the processor 180 may be configured to determine whether the realignment of the vehicle is required (S170). Particularly, the processor 180 may be configured to determine whether the realignment of the vehicle is required based on the distance between the vehicle and the nearby vehicles parked next to the vehicle and the alignment degee of the vehicle in the parking lot line. For example, the processor 180 may be configured to detect whether there is sufficient space between the parked vehicle and surrounding vehicles for a driver to enter the vehicle. When the realignment of the vehicle is required, the processor 180 may be configured to operate the driving controller 140, the steering controller 150, the shifting controller 160, and the braking controller 170 to realign the vehicle without requiring user input or user operation of the vehicle (S180).

Figure 4A:
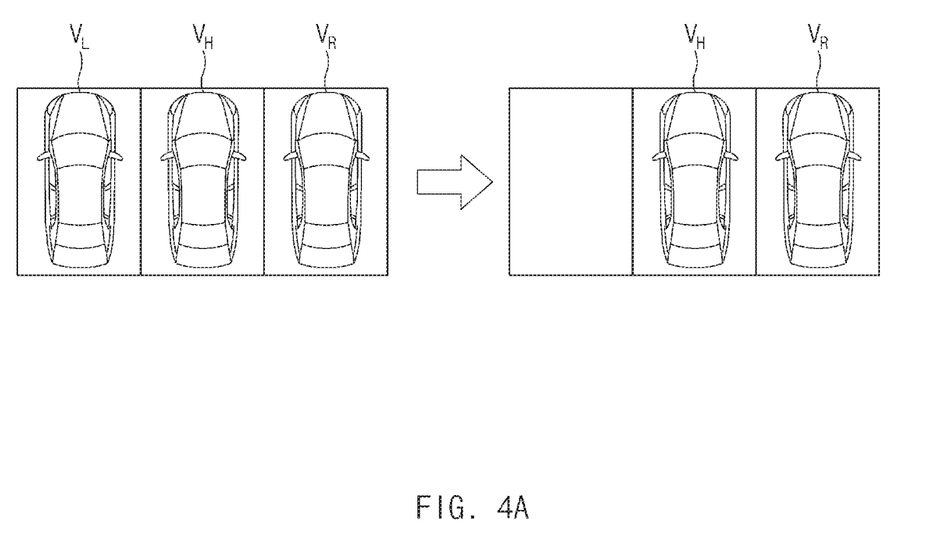
FIGS. 4A to 4D are views showing a realignment of a vehicle when a nearby vehicle parked around a vehicle according to exemplary embodiment of the present disclosure exits a parking lot.

FIGS. 4A to 4D are views showing a realignment of a vehicle when a nearby vehicle parked around the vehicle exits a parking lot according to an exemplary embodiment of the present disclosure. As shown in FIG. 4A, the vehicle $V_H$ is parked in the target parking space at a right angle in a situation in which vehicles $V_L$ and $V_R$ are previously respectively parked in a left parking space and a right parking space of the target parking space. When the vehicle $V_L$ parked on the left side of the vehicle $V_H$ pulls out of the space and an empty parking space is secured after the vehicle $V_H$ is completely parked, the processor 180 of the vehicle $V_H$ may be configured to detect or sense the change of the parking environment using the environment information detector 110.

Particularly, the processor 180 may be configured to detect whether a space between the vehicles is sufficient to allow the driver to open a driver side door and to enter the vehicle $V_H$ and whether the vehicle $V_H$ is aligned at a center of a space defined by the parking lot line to determine that the realignment of the vehicle $V_H$ is required. The processor 180 may be configured to determine that the realignment of the vehicle $V_H$ is not required when the vehicle $V_H$ is positioned at the center of the space defined by the parking lot line and the space for the driver is sufficient between the vehicle $V_H$ and the nearby vehicles $V_L$ and $V_R$ parked next to the vehicle $V_H$.

Figure 4B:
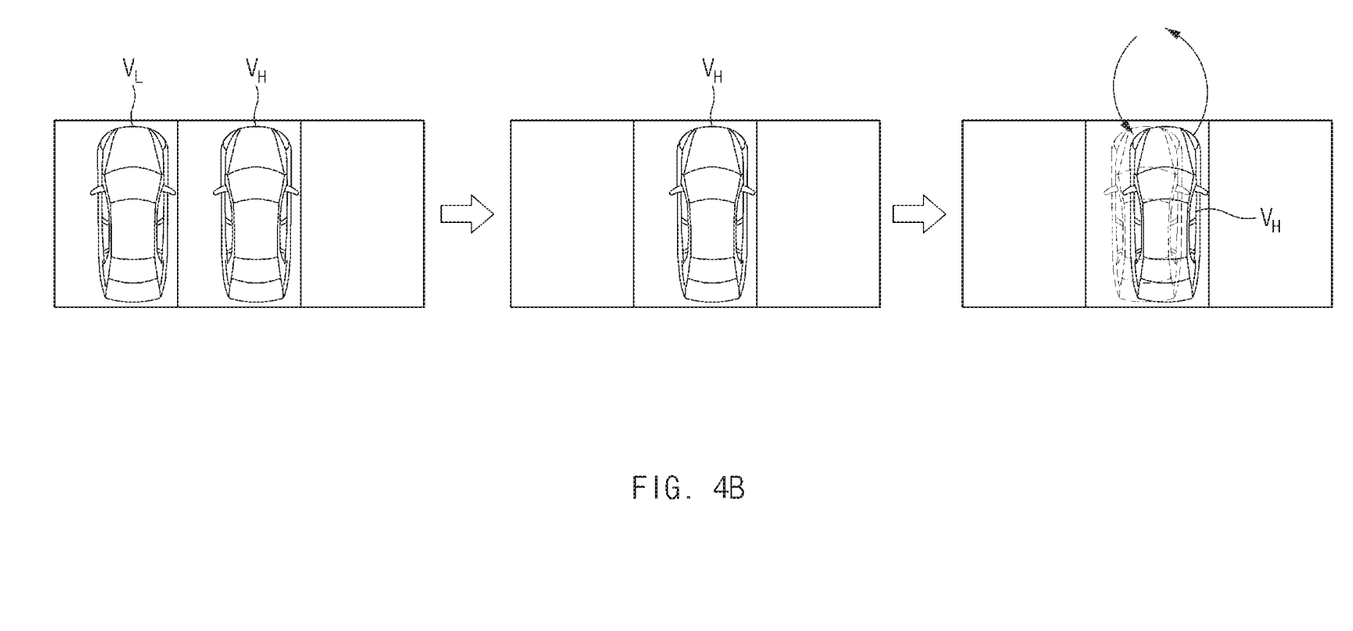
Figure 4C:
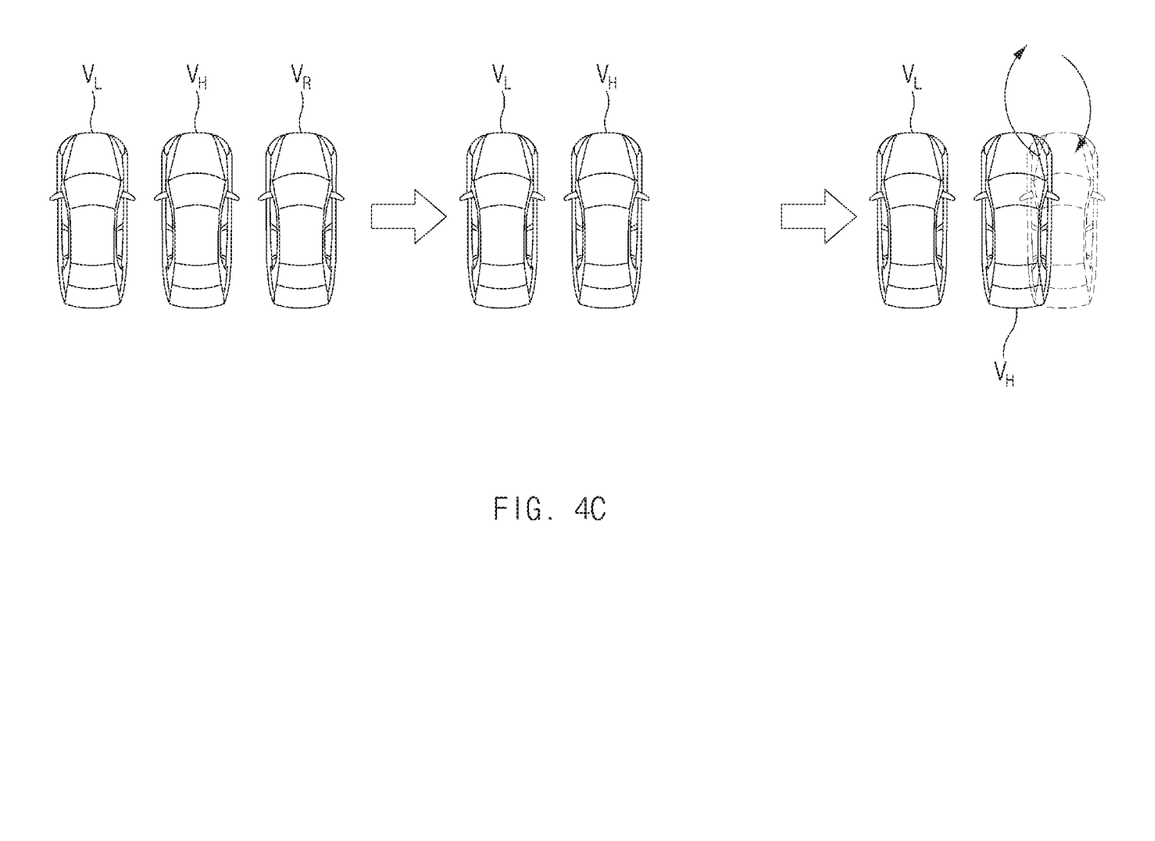

Referring to FIG. 4B, when the nearby vehicle $V_L$ parked next to the vehicle $V_H$ exits the space and the vehicle $V_H$ is not parked at the center of the space defined by the parking lot line, the processor 180 may be configured to execute the realignment of the vehicle $V_H$ to allow the vehicle $V_H$ to be positioned at the center of the space defined by the parking lot line. When the parking lot line does not exist as shown in FIG. 4C, the processor 180 may be configured to detect the exit of the vehicle $V_R$ parked in the right parking space of the vehicle $V_H$ using the environment information detector 110 when the vehicle $V_R$ parked in the right parking space of the vehicle $V_H$ exits the parking space. Further, the processor 180 may be configured to detect whether the space is sufficient enough for the driver to be able to enter the vehicle $V_H$ without being blocked by surrounding parked vehicles. Accordingly, the processor 180 may be configured to operate the vehicle $V_H$ to realign the vehicle $V_H$ when the space allowing the driver to enter the vehicle $V_H$ is not available (e.g., the space is insufficient).

Figure 4D:
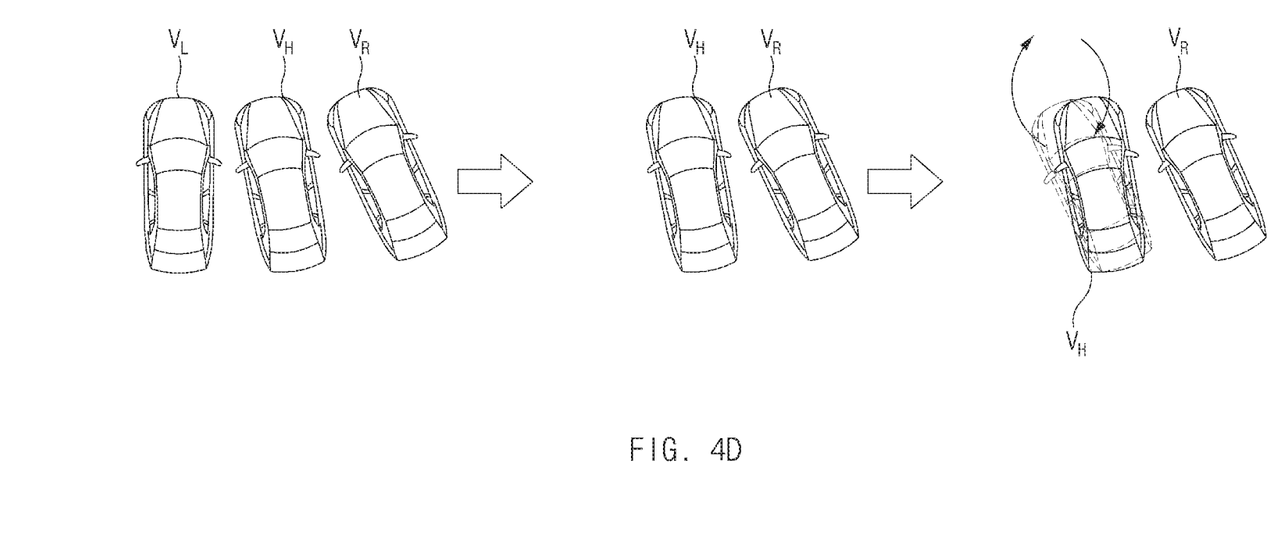

As shown in FIG. 4D, when the nearby vehicle $V_L$ exits from the parking space in which the parking lot line does not exist, the processor 180 may be configured to determine whether the realignment of the vehicle $V_H$ is required with respect to the nearby vehicle $V_R$ parked next to the vehicle $V_H$. The processor 180 may be configured to realign the vehicle $V_H$ with respect to the nearby vehicle $V_R$ when the processor 180 determines that the realignment of the vehicle $V_H$ is required.

Figure 5A:
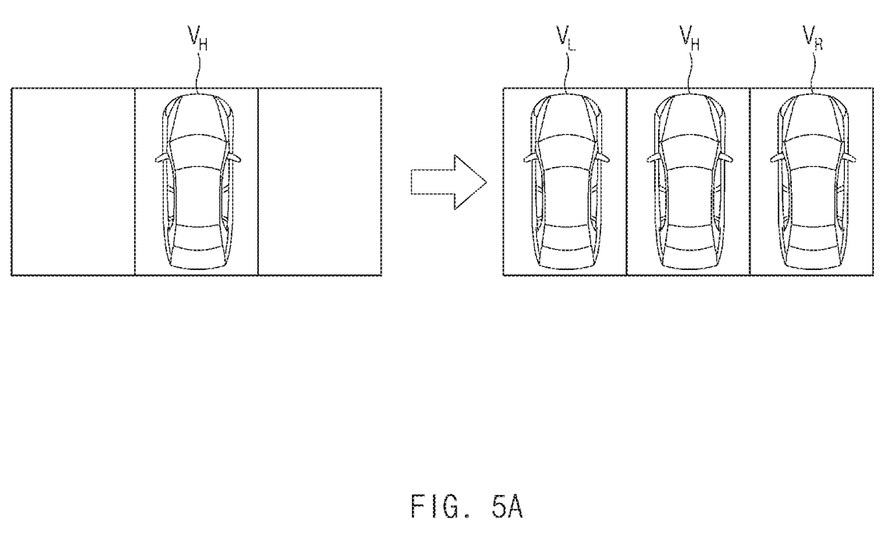
FIGS. 5A to 5D are views showing a realignment of a vehicle when a vehicle is parked around a vehicle according to exemplary embodiment of the present disclosure.

FIGS. 5A to 5D are views showing a realignment of a vehicle when a vehicle is parked around the vehicle according to an exemplary embodiment of the present disclosure. As shown in FIG. 5A, when other vehicles $V_L$ and $V_R$ are respectively parked in left and right parking spaces of the vehicle $V_H$ in the state in which the vehicle $V_H$ is parked at the center of the space defined by the parking lot line, the processor 180 may be configured to detect whether the space is available between the vehicle $V_H$ and the other vehicles $V_L$ and $V_R$. The processor 180 may be configured to maintain the vehicle position and not realign the vehicle $V_H$ when the space for allowing the driver to enter the vehicle VII is sufficiently without being blocked by other parked vehicles.

Figure 5B:
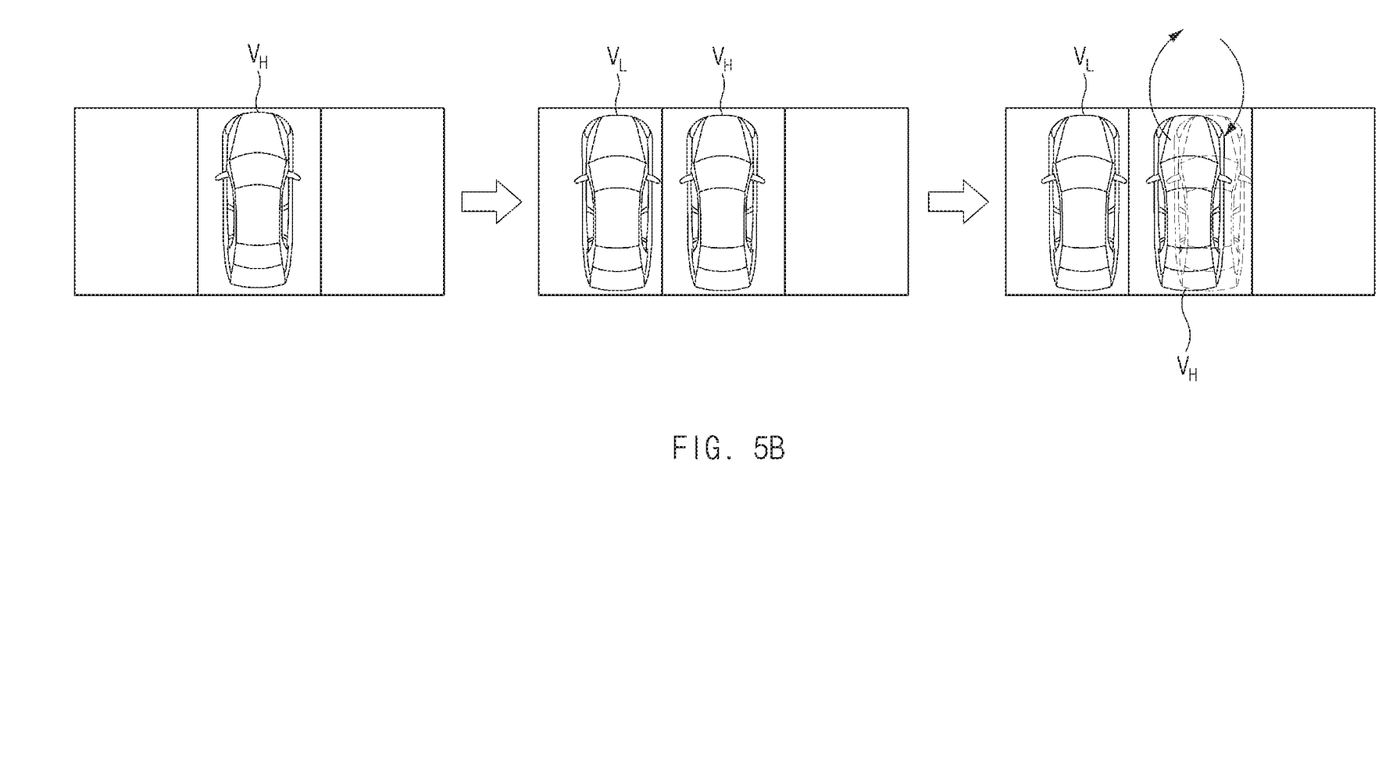

As shown in FIG. 5B, when the other vehicle $V_L$ is parked close to the left side of the vehicle $V_H$ in the state in which the vehicle $V_H$ is parked at the center of the space defined by the parking lot line, the processor 180 may be configured to detect that the other vehicle $V_L$ is parked close (e.g., in the vicinity of) to the left side of the vehicle VII using the environment information detector 110. When the space that allows the driver to enter and exit the vehicle $V_H$ is not available or sufficient due to the other vehicle $V_L$ parked close to the vehicle $V_H$ even though the vehicle $V_H$ is parked at the center of the space defined by the parking lot line, the processor 180 may be configured to realign the vehicle $V_H$ in the parking lot line to secure the space.

Figure 5C:
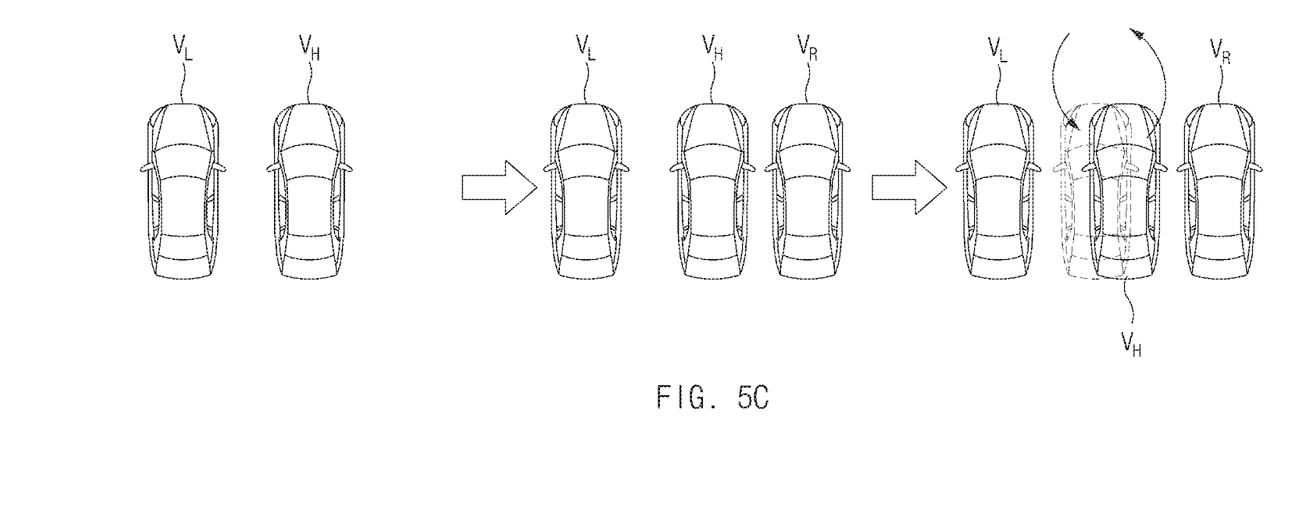

As shown in FIG. 5C, when the other vehicle $V_R$ is newly parked (e.g., not previously parked there, that is, not parked in that location when the subject vehicle is being parked) at a right side of the vehicle $V_H$ in the parking space in which the parking lot line does not exist, the processor 180 of the vehicle $V_H$ may be configured to detect that the other vehicle $V_R$ is parked at the right side of the vehicle $V_H$ using the environment information detector 110. The processor 180 may be configured to detect whether the vehicle $V_H$ is positioned at a center between the previously-parked vehicle $V_L$ and the newly-parked vehicle $V_R$. The processor 180 may then be configured to realign the vehicle $V_H$ when the vehicle $V_H$ is not positioned at the center between the two vehicles $V_L$ and $V_R$.

Figure 5D:
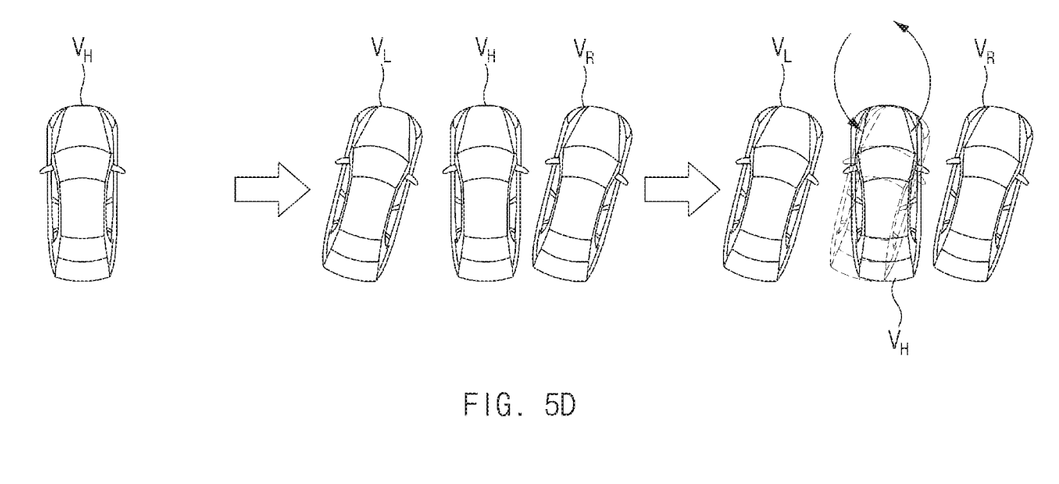

As shown in FIG. 5D, when the other vehicles $V_L$ and $V_R$ are respectively parked in empty parking spaces of left and right sides of the vehicle $V_H$, the processor 180 of the vehicle $V_H$ may be configured to detect whether an alignment degree of the vehicle $V_H$ is in agreement with alignment degrees of the other vehicles $V_L$ and $V_R$. In other words, the processor 180 may be configured to determine the angle at which other vehicles are parked and realign the subject vehicle to correspond to such an angle to thus provide sufficient space between the vehicles to allow a driver to enter and exit the vehicle without being blocked by the other parked vehicles. When the alignment degree of the vehicle $V_H$ does not correspond with the alignment degrees of the other vehicles $V_L$ and $V_R$, the processor 180 may be configured to realign the vehicle $V_H$ to allow the alignment degree of the vehicle $V_H$ to correspond with the alignment degrees of the other vehicles $V_L$ and $V_R$.

In the above described scenarios, even though all the components configuring the exemplary embodiment of the present invention as described above are coupled as one or are operated by being coupled with each other, the present invention is not necessarily limited to the exemplary embodiments. That is, all the components may be operated by being optionally coupled with each other within the scope of the present invention. All the components may be each implemented in one independent hardware, but a part or all of the respective components may be selectively combined to be implemented as a computer program having a program module performing some functions or all the functions combined in one or a plurality of hardwares.

According to the above, the autonomous parking assist apparatus may be configured to monitor the change in the surrounding environment of the vehicle after the vehicle is parked and re-parks the vehicle, when necessary, to improve the alignment degree of the vehicle. Thus, the autonomous parking assist apparatus may improve the situation in which the driver may not enter the vehicle due to the change in the parking environment. In addition, although the vehicle is not aligned in the parking space due to the surrounding environment in the parking lot, the vehicle may be parked in the parking space through the realignment process.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous parking assist apparatus, comprising:
   an environment information detector configured to detect surrounding environment information of a vehicle; and
   a processor configured to sense whether a change in a parking environment occurs using the environment information detector after the vehicle is parked in a target parking space, determine whether a realignment of the vehicle is required, and execute the realignment of the vehicle in the target parking space based on the determined result,
   wherein the parking environment is occupancy states of a left parking space and a right parking space of the target parking space.

2. The autonomous parking assist apparatus of claim 1, wherein the environment information detector includes at least one of an imaging device, a radar, a LiDAR, and an ultrasonic sensor.

3. The autonomous parking assist apparatus of claim 1, wherein the processor is configured to sense whether another vehicle parked next to the vehicle exits a parking space using the surrounding environment information.

4. The autonomous parking assist apparatus of claim 1, wherein the processor is configured to sense whether another vehicle is parked in an empty parking space around the vehicle based on the surrounding environment information.

5. The autonomous parking assist apparatus of claim 1, wherein the processor is configured to periodically sense whether the change in the parking environment occurs using the environment information detector.

6. The autonomous parking assist apparatus of claim 1, wherein the processor is configured to determine whether the realignment of the vehicle is required based on whether a space is sufficient between the vehicle and another vehicle parked next to the vehicle.

7. The autonomous parking assist apparatus of claim 6, wherein the space is a space that sufficient to allow a driver to open a door of the vehicle and to enter the vehicle.

8. The autonomous parking assist apparatus of claim 1, wherein the processor is configured to determine whether the realignment of the vehicle is required based on whether the vehicle is parked at a center of a space defined by a parking lot line.

9. The autonomous parking assist apparatus of claim 1, wherein, when the vehicle is parked in a parking space in which a parking lot line does not exist, the processor is configured to determine whether the realignment of the vehicle is required based on whether an alignment degree of the vehicle corresponds to alignment degrees of other vehicles parked next to the vehicle.

10. A method for assisting a parking of a vehicle using an autonomous parking assist apparatus, comprising:
    sensing, by a controller, whether a change in a parking environment of the vehicle occurs after the vehicle is parked in a target parking space;
    determining, by the controller, whether a realignment of the vehicle is required when the change is sensed in the parking environment; and
    performing, by the controller, the realignment of the vehicle in the target parking space when the realignment of the vehicle is required,
    wherein the parking environment is occupancy states of a left parking space and a right parking space of the target parking space.

11. The method of claim 10, wherein the sensing of the change in the parking environment includes:
    entering, by the controller, a standby mode after the vehicle is parked;
    detecting, by the controller, whether an exit of the vehicle from a parking space is requested after waiting for a predetermined period of time in the standby mode; and
    sensing, by the controller, whether the change in the parking environment occurs when the exit of the vehicle is not requested.

12. The method of claim 11, wherein the sensing of the change in the parking environment includes sensing whether another vehicle parked next to the vehicle exits.

13. The method of claim 11, wherein the sensing of the change in the parking environment includes sensing whether another vehicle is parked in an empty parking space around the vehicle.

14. The method of claim 10, wherein the determining of whether the realignment of the vehicle is required is performed based on whether a space is sufficient between the vehicle and another vehicle parked next to the vehicle.

15. The method of claim 10, wherein the determining of whether the realignment of the vehicle is required is performed based on whether the vehicle is parked at a center of a space defined by a parking lot line.

16. The method of claim 10, wherein, when the vehicle is parked in a parking space in which a parking lot line does not exist, the determining of whether the realignment of the vehicle is required is performed based on whether an alignment degree of the vehicle corresponds to alignment degrees of other vehicles parked next to the vehicle.

17. A non-transitory computer readable medium containing program instructions executed by a processor to assist a parking of a vehicle using an autonomous parking assist apparatus, the computer readable medium comprising:
   program instructions that sense whether a change in a parking environment of the vehicle occurs after the vehicle is parked in a target parking space;
   program instructions that determine whether a realignment of the vehicle is required when the change is sensed in the parking environment; and
   program instructions that perform the realignment of the vehicle in the target parking space when the realignment of the vehicle is required,
   wherein the parking environment is occupancy states of a left parking space and a right parking space of the target parking space.

18. The non-transitory computer readable medium of claim 17, wherein the program instructions that sense the change in the parking environment includes:
   program instructions that enter a standby mode after the vehicle is parked;
   program instructions that detect whether an exit of the vehicle from a parking space is requested after waiting for a predetermined period of time in the standby mode; and
   program instructions that sense whether the change in the parking environment occurs when the exit of the vehicle is not requested.

19. The non-transitory computer readable medium of claim 18, wherein the program instructions that sense the change in the parking environment include instructions that sense whether another vehicle parked next to the vehicle exits.

20. The non-transitory computer readable medium of claim 17, wherein the program instructions that determine whether the realignment of the vehicle is required are performed based on whether a space is sufficient between the vehicle and another vehicle parked next to the vehicle.

* * * * *